(12) United States Patent
Lange

(10) Patent No.: US 6,412,871 B1
(45) Date of Patent: Jul. 2, 2002

(54) CAR WITH A LOCKING MECHANISM

(75) Inventor: Dieter Lange, Petershagen (DE)

(73) Assignee: Bertrand Faure Sitztechnik GmbH & Co. KG, Stadthagen (DE)

( * ) Notice: Subject to any disclaimer, the term of this patent is extended or adjusted under 35 U.S.C. 154(b) by 0 days.

(21) Appl. No.: 09/680,451

(22) Filed: Oct. 6, 2000

(30) Foreign Application Priority Data

Oct. 6, 1999 (DE) .......................................... 199 48 000

(51) Int. Cl.[7] .................................................. B60N 2/02
(52) U.S. Cl. ........................ 297/366; 297/367; 403/97; 74/577 M
(58) Field of Search ................................. 297/366, 367; 403/321, 322.1, 325, 92, 93, 97; 74/577 M

(56) References Cited

U.S. PATENT DOCUMENTS

| | | | | |
|---|---|---|---|---|
| 5,138,744 A | * | 8/1992 | Coggon | 297/367 X |
| 5,150,632 A | * | 9/1992 | Hein | 297/367 X |
| 5,156,439 A | * | 10/1992 | Idlani et al. | 297/367 |
| 5,522,643 A | * | 6/1996 | Matsuura | 297/367 |
| 5,590,932 A | * | 1/1997 | Olivieri | 297/367 |
| 5,718,481 A | * | 2/1998 | Robinson | 297/367 |
| 5,733,008 A | * | 3/1998 | Tame | 297/367 X |
| 5,788,330 A | * | 8/1998 | Ryan | 297/367 X |
| 5,813,725 A | * | 9/1998 | Robinson | 297/367 |

FOREIGN PATENT DOCUMENTS

| | | |
|---|---|---|
| DE | 3635023 A1 | 10/1986 |
| DE | 19650822 C1 | 12/1996 |
| DE | 19733762 C1 | 8/1997 |

* cited by examiner

Primary Examiner—Peter M. Cuomo
Assistant Examiner—Rodney B. White
(74) Attorney, Agent, or Firm—Connolly Bove Lodge & Hutz

(57) ABSTRACT

A locking mechanism for an adjustment device of a car seat is provided with a first and a with a second locking element having mutually interlocking tooth gear regions, wherein at least one locking element is formed as a precision blanking element and provided with a projection arranged next to the tooth gear, protecting the tooth gear against lateral slippage. The projection per se is constructed at least along the entire length of a bridge extended over the tooth gear, while a second locking element is extend opposite in the direction of the first locking element. The bridge is guided on both sides in a groove running parallel to the tooth gear of the second locking element.

20 Claims, 6 Drawing Sheets

CAR WITH A LOCKING MECHANISM

TECHNICAL FIELD

The invention relates to a car with a locking mechanism for an adjustment device for a car seat. In particular, the present invention provides a particularly stable lateral guidance effective along the entire length of the gear tooth mechanism of mutually mating gear tooth regions.

BACKGROUND OF INVENTION

According to a locking mechanism of the known type (DE 197 33 762 C1), gear tooth systems manufactured with the precision blanking (die cutting) procedure are constructed for protection of mutually interlocking gear tooth components to prevent lateral slippage of projecting parts which are built in the form of catches separated from each other by a certain distance. The lateral projecting parts can be formed only outside of the gear tooth region supporting the gear tooth locking elements. A mutually staggered arrangement of projecting parts can be produced and deployed on the opposite sides of the gear tooth system. An interconnected support for the locking element on both sides is therefore not enabled.

Another locking mechanism is also known (DE 36 35 023 A1), wherein two retention regions are produced with the hot gear wheel unrolling procedure on different sides of the gear wheel system, producing lateral overlapping of the gear wheel elements on the opposite side.

A similar manufacturing procedure is expensive and relatively imprecise. Moreover, the heating of the workpiece, which is critically important for the hot gear wheel unrolling procedure, results in a heat delay.

SUMMARY OF INVENTION

In view of the current state of the technology, the task of the present invention is to improve the lateral guidance in the gear tooth region produced with precision blanking in a locking mechanism according to known prior art.

The solution of this task is accomplished in accordance with the locking mechanism of the present invention. In particular, the present invention relates to a locking mechanism for an adjustment device of a car seat is provided with a first and a with a second locking element having mutually interlocking tooth gear regions, wherein at least one locking element is formed as a precision blanking element and provided with a projection arranged next to the tooth gear, protecting the tooth gear against lateral slippage. The projection per se is constructed at least along essentially the entire length of a bridge extended over the tooth gear, while a second locking element is extend opposite in the direction of the first locking element. The bridge is guided on both sides in a groove running parallel to the tooth gear of the second locking element.

The solution of this invention provides a particularly stable lateral guidance effective along the entire length of the gear tooth mechanism of mutually mating gear tooth regions.

Still other objects and advantages of the present invention will become readily apparent by those skilled in the art from the following detailed description, wherein it is shown and described preferred embodiments of the invention, simply by way of illustration of the best mode contemplated of carrying out the invention. As will be realized the invention is capable of other and different embodiments, and its several details are capable of modifications in various obvious respects, without departing from the invention. Accordingly, the description is to be regarded as illustrative in nature and not as restrictive.

BEST AND VARIOUS MODES FOR CARRYING OUT INVENTION

Figure 1:
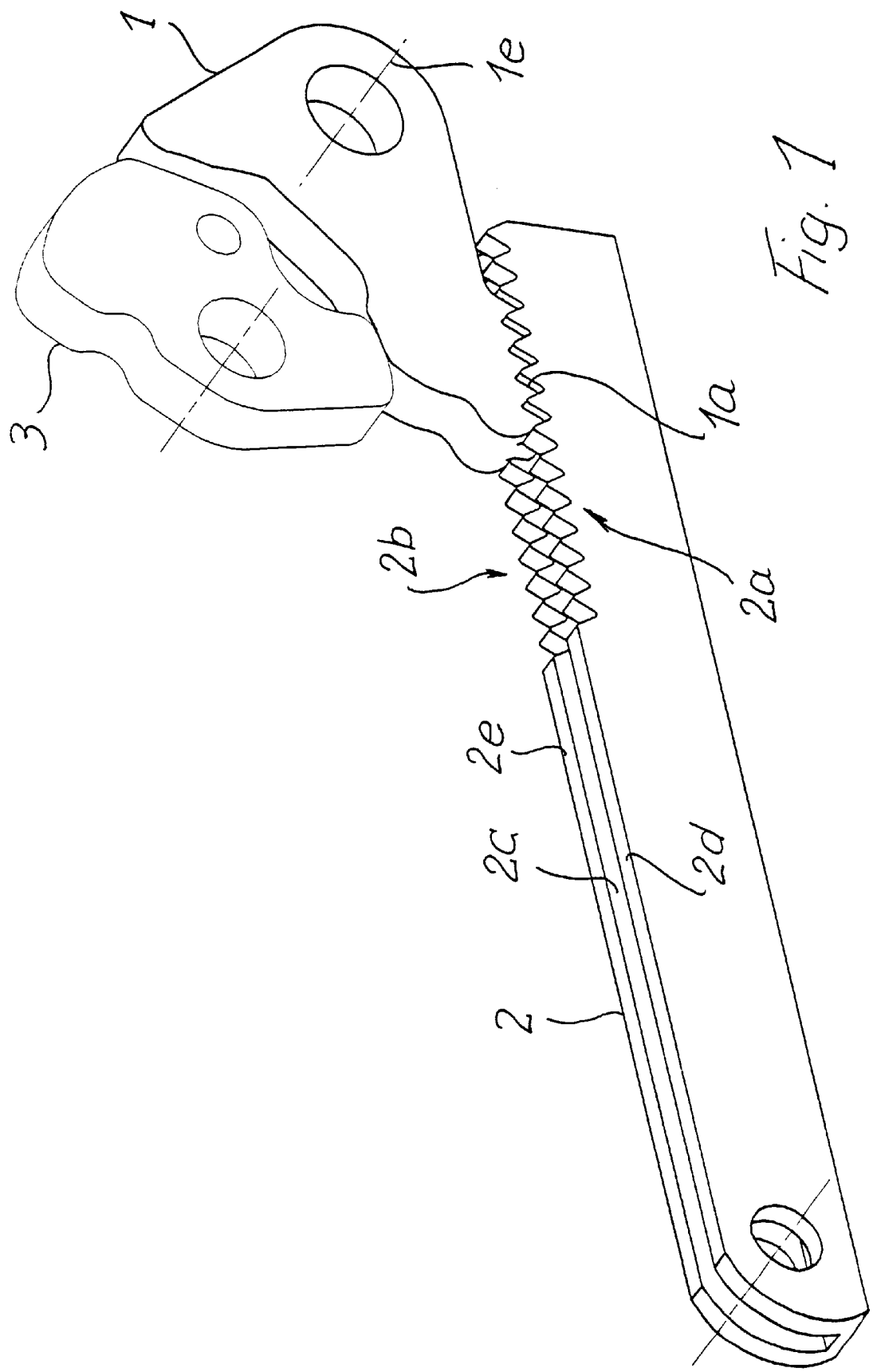
FIG. 1 is a schematic view of a locking mechanism according to a first embodiment form shown as a perspective representation.
Figure 2:
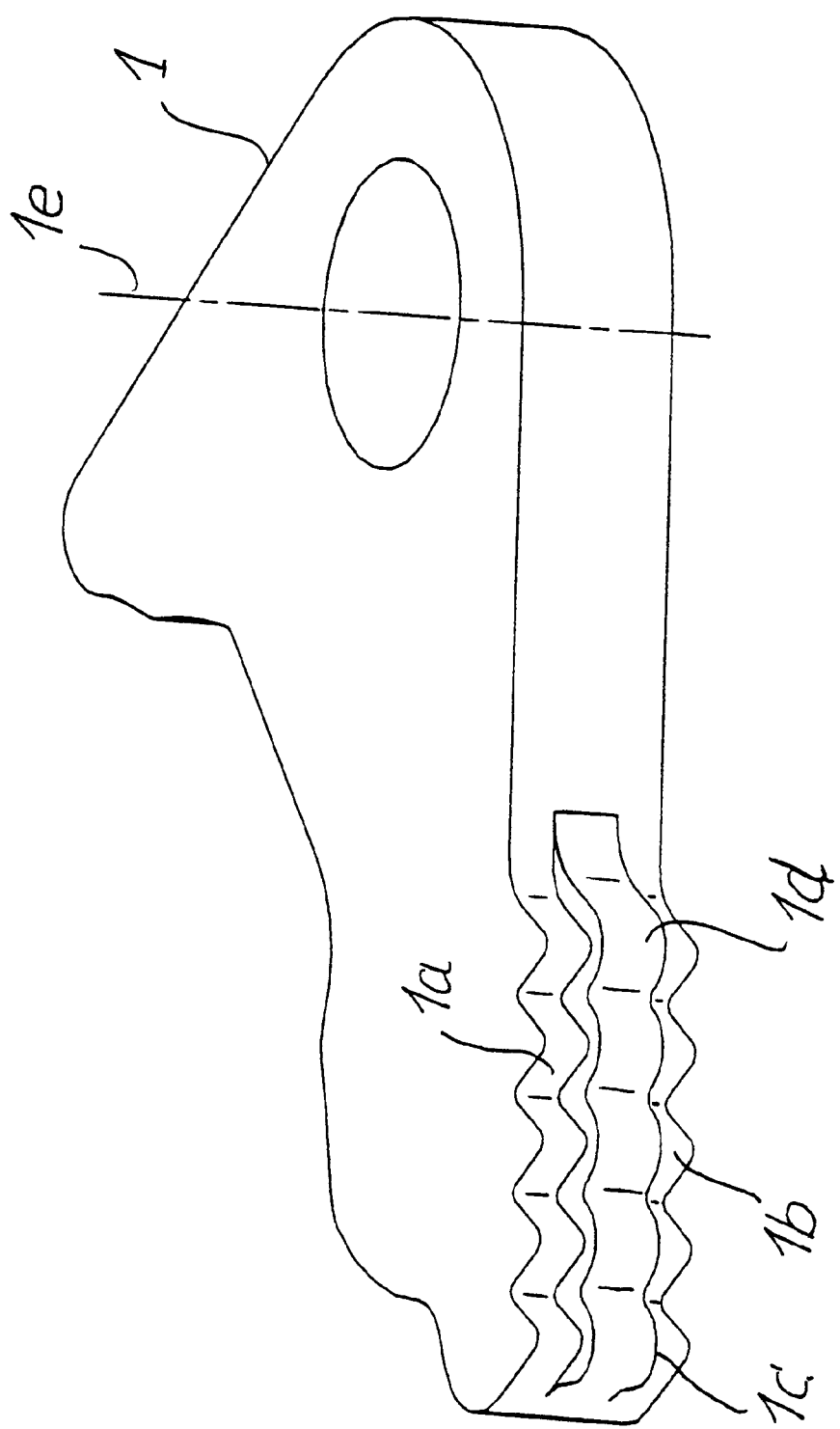
FIG. 2 is a perspective representation of a first adjustment element of the locking mechanism according to FIG. 1.
Figure 3:
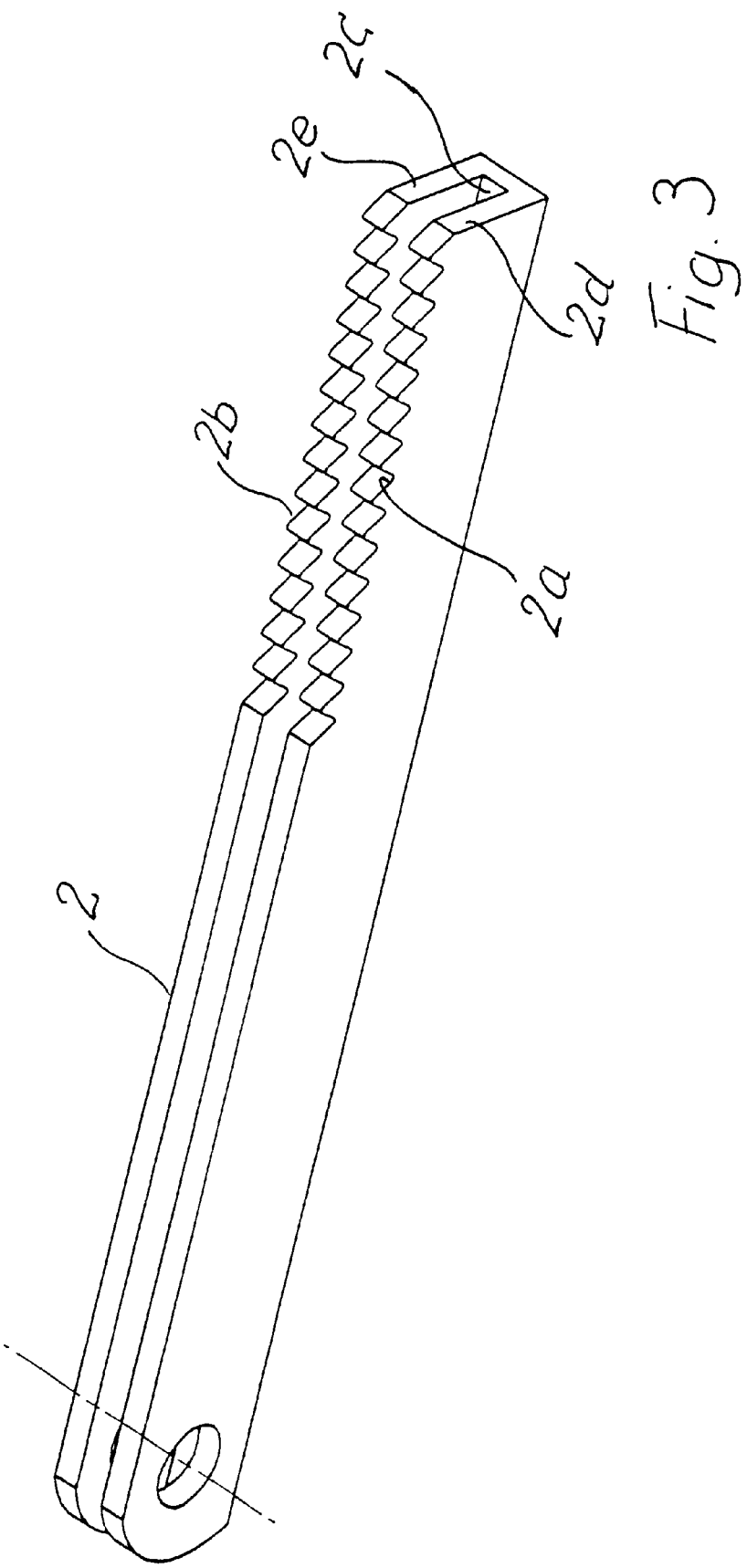
FIG. 3 is a perspective representation of a second adjustment element of the locking mechanism according to FIG. 1.

Two preferred embodiments of this invention will now be explained in detail based on the enclosed figures. The same reference numbers are assigned to identical parts shown in the figures and the parts are also differentiated with an apostrophe when this is required.

The locking mechanism is provided with a first locking element 1 which is connected with a part of a car seat that is not shown in the figure so that it is rotatable around axis 1e. The locking element 1 can be adjusted relative to a second locking element 2, which is connected to another part of the car seat, not shown in the figure, which is adjustable relative to this part of the car seat or connected in a fixed manner to the car body of the vehicle.

The locking element 1 supports tooth gear regions 1a and 1b which run parallel to each other and which are mating with tooth gear regions 2a and 2b on the second locking element 2. The engagement of both gear regions 1a or 1b and 2a or 2b is maintained by a locking cam 3. The locking regions 1a and 1b are separate from each other by bridge 1c which is jutting out of the tooth gear regions 1a and 1b of the tooth gear in the direction of the swinging movement. The bridge 1c runs parallel to the tooth gear regions 1a and 1b and it is equipped with the undulating front surface 1d, whose wavy shape is determined by the manufacturing process and corresponds to the tooth pitch.

The second locking element 2 is provided with a U-shaped profile whose both flanks 2d and 2e are provided with tooth gear regions 2a and 2b. Bridge 1c snaps into groove 2c whose boundary is determined by flanks 2d and 2e when the mechanism is locked. When bridge 1c is introduced into groove 2c, it prevents lateral slippage of the engaged tooth gears even when high loads are applied, as well as tilting of each tooth gear region with respect to the other region.

Figure 4:
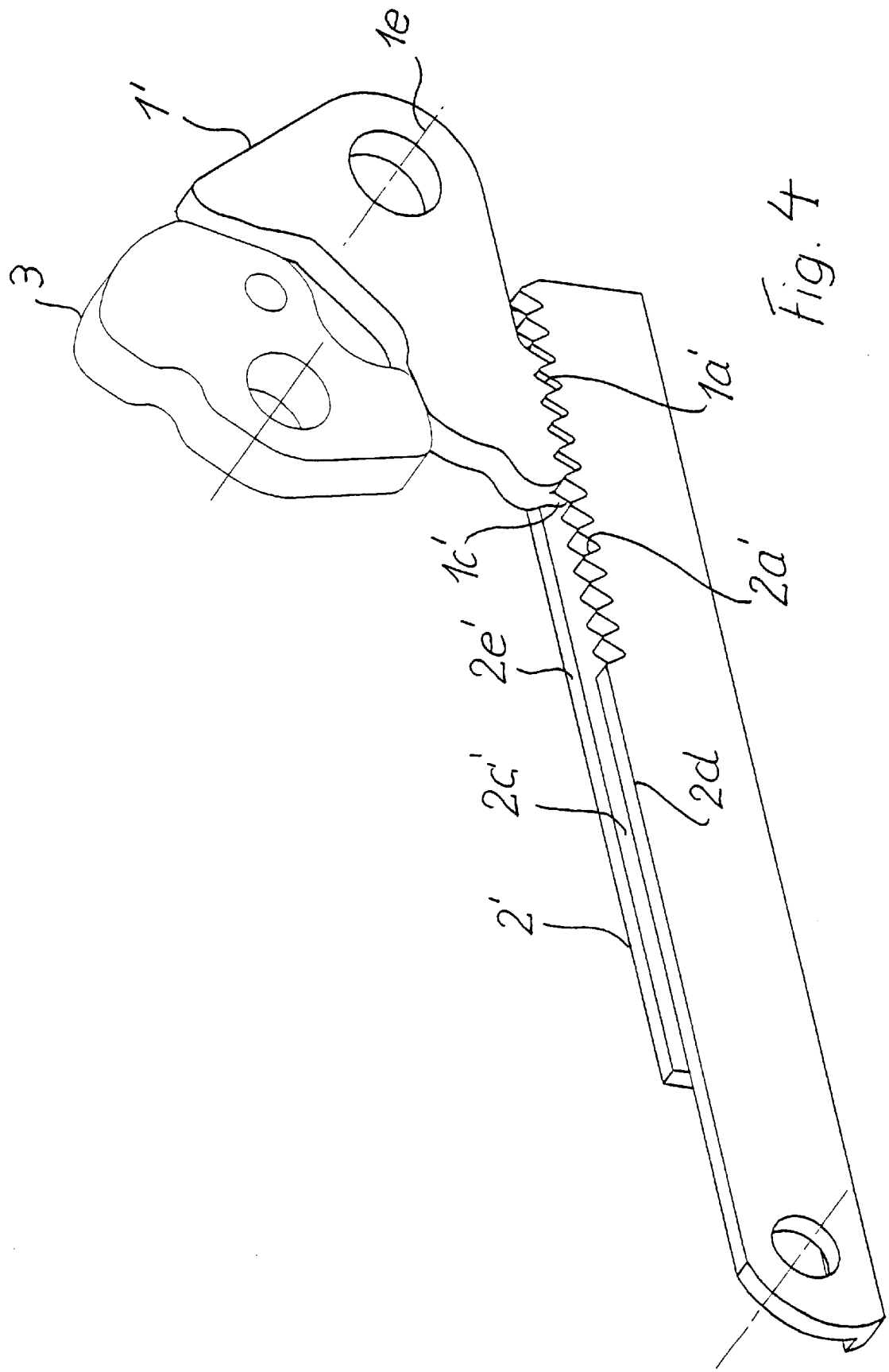
FIG. 4 is a schematic view, analogous to FIG. 1, of a second embodiment form of a locking mechanism shown as a perspective representation.
Figure 5:
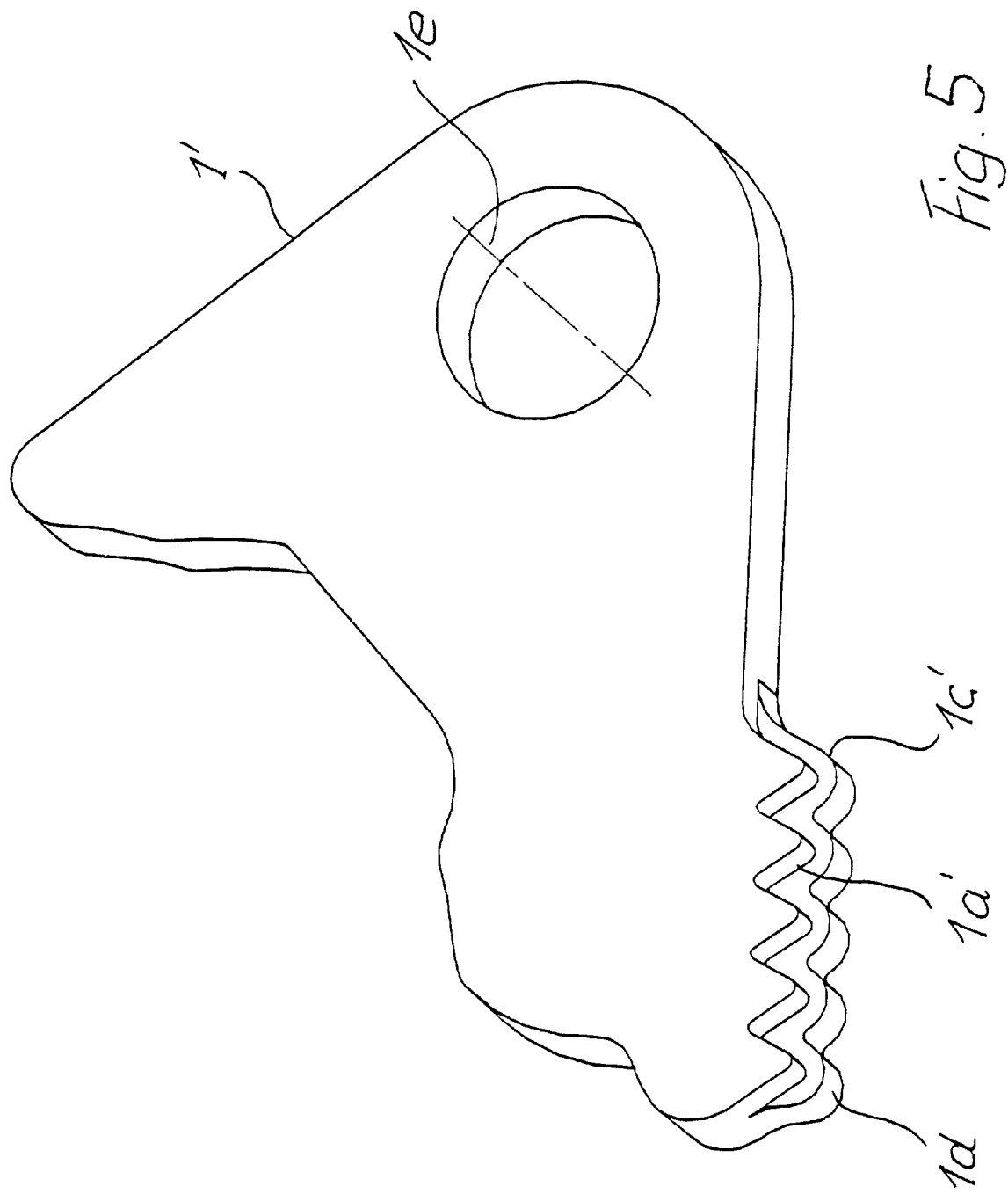
FIG. 5 is a perspective representation of a first adjustment element of the locking mechanism according to FIG. 4.
Figure 6:
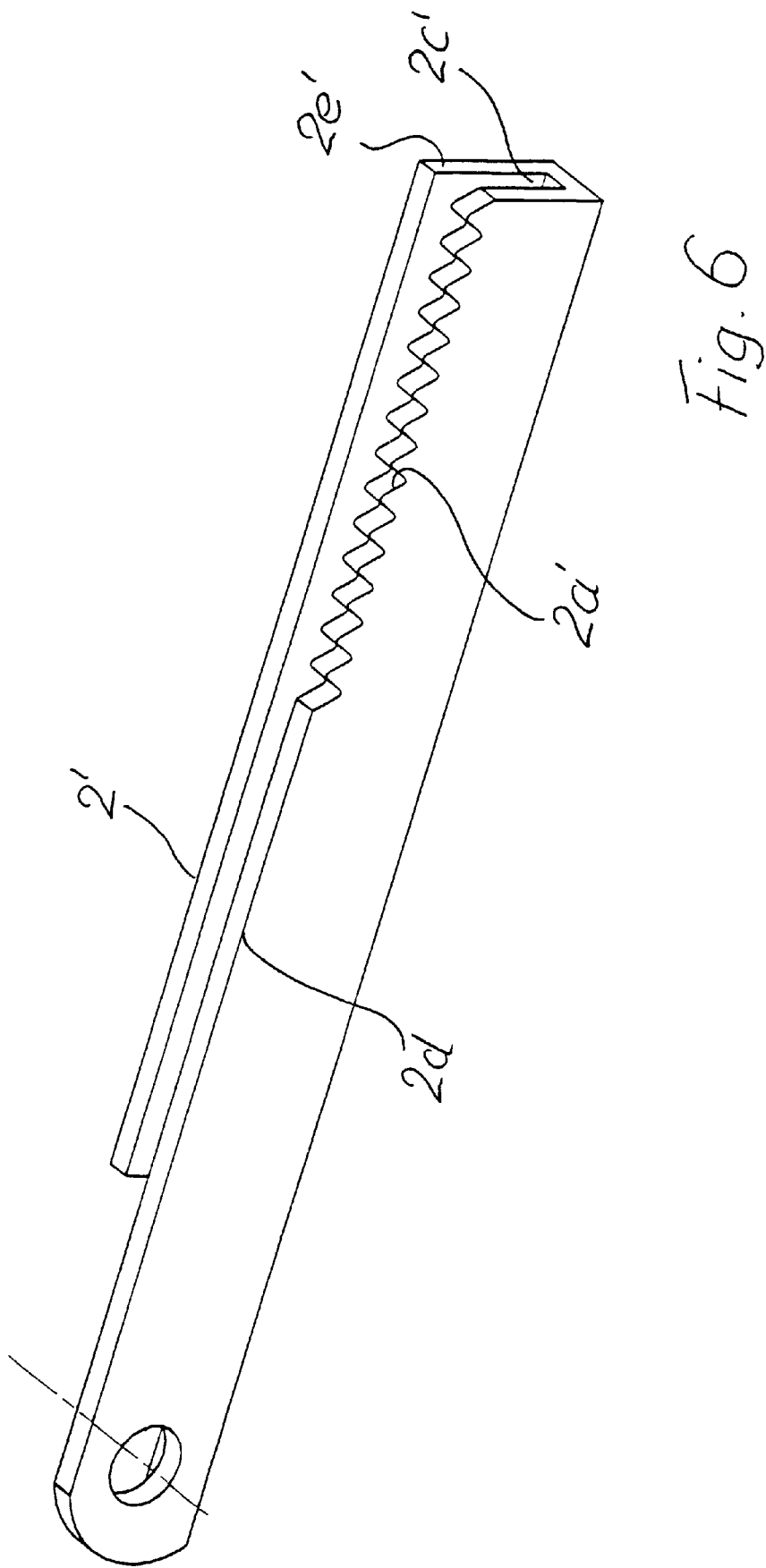
FIG. 6 is a perspective representation of a second locking element of the locking mechanism according to FIG. 4.

The second embodiment form shown in FIGS. 4 through 6 is provided with a tooth gear region 1a on the first locking element 1' only on one side of bridge 1c'. Accordingly, the second locking element 2' is provided with tooth gear region 2a' only on one flank 2d. The other flank 2e' is not formed in the tooth gear shape. Bridge 1c is engaged in groove 2c, which is constructed with an indented flank 2d and a non-indented flank 2e'.

The mechanism is not limited only to linear tooth gear regions. It can be also realized with a curved or circular shape of tooth gears, resulting in curved or circular grooves and bridges. Applications for this design are suitable in particular for inclination adjusting mechanisms in backrests or height adjusting mechanisms in car seats.

The foregoing description of the invention illustrates and describes the present invention. Additionally, the disclosure shows and describes only the preferred embodiments of the invention but, as mentioned above, it is to be understood that the invention is capable of use in various other combinations, modifications, and environments and is capable of changes or modifications within the scope of the inventive concept as expressed herein, commensurate with the above teachings and/or the skill or knowledge of the relevant art. The embodiments described hereinabove are further intended to explain best modes known of practicing the invention and to enable others skilled in the art to utilize the invention in such, or other, embodiments and with the various modifications required by the particular applications or uses of the invention. Accordingly, the description is not intended to limit the invention to the form disclosed herein. Also, it is intended that the appended claims be construed to include alternative embodiments.

What is claimed is:

1. A locking mechanism for an adjustment apparatus of a car seat, comprising a first locking element with a tooth gear region and a second locking element with a tooth gear region that couples to the tooth gear region of the first locking element, wherein the first or the second locking element is a precision blanking part that includes a projection extending essentially over the entire length of a bridge engaged by a tooth gear which is extended toward the tooth gear region supporting a bridge, and the second locking element mounted in a direction opposite the first locking element is guided on both sides by a groove that runs parallel to a tooth gear of the second locking element.

2. The locking mechanism according to claim 1, wherein the groove includes a border with an indented flank on one side and a non-indented flank on the other side.

3. The locking mechanism according to claim 2, wherein a front surface of the bridge is constructed uneven.

4. The locking mechanism according to claim 2, wherein the bridge is constructed from material displaced during precision blanking of the toothed gear region or regions.

5. The locking mechanism according to claim 3, wherein the bridge is constructed from material displaced during precision blanking of the toothed gear region or regions.

6. The locking mechanism according to claim 2, wherein the toothed gear regions of the first and/or second locking element are curved.

7. The locking mechanism according to claim 3, wherein the toothed gear regions of the first and/or second locking element are curved.

8. The locking mechanism according to claim 4, wherein the toothed gear regions of the first and/or second locking element are curved.

9. The locking mechanism according to claim 1, wherein the groove includes a border with indented flanks on both sides.

10. The locking mechanism according to claim 9, wherein a front surface of the bridge is constructed uneven.

11. The locking mechanism according to claim 9, wherein the bridge is constructed from material displaced during precision blanking of the toothed gear region or regions.

12. The locking mechanism according to claim 10, wherein the bridge is constructed from material displaced during precision blanking of the toothed gear region or regions.

13. The locking mechanism according to claim 9, wherein the toothed gear regions of the first and/or second locking element are curved.

14. The locking mechanism according to claim 10, wherein the toothed gear regions of the first and/or second locking element are curved.

15. The locking mechanism according to claim 1, wherein a front surface of the bridge is constructed uneven.

16. The locking mechanism according to claim 15, wherein the bridge is constructed from material displaced during precision blanking of the toothed gear region or regions.

17. The locking mechanism according to claim 15, wherein the toothed gear regions of the first and/or second locking element are curved.

18. The locking mechanism according to claim 1, wherein the bridge is constructed from material displaced during precision blanking of the toothed gear region or regions.

19. The locking mechanism according to claim 18, wherein the toothed gear regions of the first and/or second locking element are curved.

20. The locking mechanism according to claim 1, wherein the toothed gear regions of the first and/or second locking element are curved.

* * * * *